United States Patent
Sowig (10) Patent No.: US 6,204,882 B1
(45) Date of Patent: Mar. 20, 2001

(54) γ MATCHING OF A VIDEO PROCESSOR BY MEANS OF THREE MEASURED CURRENTS (75) Inventor: Helmut Sowig, Villingen-Schwenningen (DE)

(73) Assignee: Deutsche Thomson-Brandt GmbH, Villingen-Schwenningen (DE)

(*) Notice: Subject to any disclaimer, the term of this patent is extended or adjusted under 35 U.S.C. 154(b) by 0 days.

(21) Appl. No.: 09/337,907

(22) Filed: Jun. 22, 1999

(30) Foreign Application Priority Data

Jun. 22, 1998 (DE) .............................................. 198 27 733
Dec. 31, 1998 (DE) .............................................. 198 60 897

(51) Int. Cl.[7] .............................. H04N 5/68; H04N 5/14; H04N 5/57; H04N 5/16; H04N 5/52
(52) U.S. Cl. ..................... 348/380; 348/380; 348/673; 348/678; 348/687; 348/694; 348/696; 315/387; 315/383
(58) Field of Search ......................... 348/380, 673, 348/678, 687, 691, 679, 682, 690, 694, 695, 696, 377, 379; 315/387, 383

(56) References Cited

U.S. PATENT DOCUMENTS

| | | | |
|---|---|---|---|
| 4,489,349 | * 12/1984 | Okada | 358/168 |
| 5,278,476 | * 1/1994 | Ten Pierick et al. | 315/383 |
| 5,394,195 | * 2/1995 | Herman | 348/675 |
| 5,526,058 | * 6/1996 | Sano et al. | 348/647 |
| 5,784,106 | * 7/1998 | Sluyterman | 348/380 |
| 5,786,871 | * 7/1998 | Penney | 348/609 |
| 5,835,161 | * 11/1998 | Keller | 348/674 |
| 5,894,327 | * 4/1999 | Grienpentrog | 348/379 |

FOREIGN PATENT DOCUMENTS

| | | | |
|---|---|---|---|
| 0542347A2 | 5/1993 | (EP) | G09G/1/00 |
| 0630160A | 12/1994 | (EP) | H04N/9/69 |

OTHER PUBLICATIONS

Patent Abstracts of Japan, vol. 95, No. 7, Aug. 31, 1995 and JP 07 107340 A of Apr. 21, 1995.
European Search Report citing the above-listed references: AM, AN, and AR.

* cited by examiner

Primary Examiner—John K. Peng
Assistant Examiner—Paulos Natnael
(74) Attorney, Agent, or Firm—Joseph S. Tripoli; Paul P. Kiel (57) ABSTRACT

Recent circuit concepts inject measurement lines, for cutoff and drive control of the cathode current, into each color channel during the vertical frame blanking period. Owing to the physically dependent exponential beam current characteristic profile as a function of the cathode control voltage $V_K$, the exponent γ of the characteristic profile and the ratio of two cathode components $I_{K1}$ and $I_{K2}$ may be used to form control reference values for cutoff and drive control, this process being started in each case from a fixed value of the exponent γ or of the ratio of the two cathode currents $I_{K1}$ and $I_{k2}$. However, it has been found that, if a fixed value is assumed for the exponent γ or for the ratio of the two cathode currents $I_{K1}$ and $I_{K2}$, it is not possible to achieve an optimum result for displaying monochrome pictures. Thus, according to the invention, the exponent γ is defined as a function of the color tube 1. The aim in this case is to reduce a γ-dependent DC voltage offset $u_{of}$ to zero.

3 Claims, 7 Drawing Sheets

| STEP NO. | SWITCH 10 IN POSITION | | | SWITCH 6 (CUTOFF) | SWITCH 7 (DRIVE) | SWITCH 13 ($I_{K3}$) | SWITCH 19 ($I_{K3}$) | SWITCH 15 IN POSITION | | SWITCH 20 IN POSITION | |
|---|---|---|---|---|---|---|---|---|---|---|---|
| | a | b | c | | | | | a | b | a | b |
| 101 | X | | | X | | | | | | | |
| 102 | | X | | | | | | | X | X | |
| 103 | | | | | X | | | X | | X | |
| 104 | | | | | | | | X | | X | |
| 105 | | | X | | | X | X | | | | |
| 106 | | | X | X | | X | X | X | | | |
| 107 | X | | | | X | | | | | X | |
| 108 | | X | | | | | | | | | |
| 109 | | | | | | | | | | | |

SWITCH POSITION OF SWITCHES 6, 7, 13 AND 19:
X - CLOSED, I.E. THE SIGNAL IS PASSED ON VIA THESE SWITCHES

SWITCH POSITION OF THE SWITCHES 10, 15 AND 20:
X - SWITCH POSITION IN WHICH A SIGNAL CAN BE PASSED ON.

FIG. 3b

γ MATCHING OF A VIDEO PROCESSOR BY MEANS OF THREE MEASURED CURRENTS

BACKGROUND OF THE INVENTION

The invention relates to cutoff and gain control for a device for displaying video signals. It is based on a colour tube in a colour television set, and on projection tubes for displaying video signals.

One precondition for correct colour-video reproduction is that monochrome pictures are reproduced with neutral colours. This requires adaptation of the tube cutoff points—also called cutoff trimming—as well as a specific ratio of the cathode currents at a so-called white point, which can be achieved by means of an adjustment process which is known as gain or drive trimming.

Control circuits are used in order, in particular, to keep the cutoff points of a colour tube stable, despite ageing. To this end, measurement lines are injected in a sequential manner for the three colour channels, also called RGB colour channels, during the frame blanking period, and these measurement lines are normally equivalent to a relatively small signal amplitude so that the correction process is carried out to a value which comes as close as possible to the actual cutoff points of tube systems. The cathode currents during the measurement lines are measured, and are compared with a reference value. A DC voltage offset, in practice equivalent to a brightness offset, is used to raise or lower the measurement lines for each colour channel in the event of a control error, in such a manner that the measurement currents correspond to the reference value. However, the control process cannot ensure that the actual black level of the signal corresponds to the cutoff points of the tube. Furthermore, there is no correction for any changes in the gain.

Recent circuit concepts thus inject a further measurement line, whose amplitude is greater, into each colour channel for gain control, which is also known as drive control (for example so-called cutoff measurement lines in one field and so-called drive measurement lines in the other field, alternately). Such a control system by means of two different reference values represents a two-point control system which, in practice, is formed by two control loops. Two different cathode control voltages $V_{K1}$ and $V_{K2}$, to which two different voltage levels of the respective RGB signal correspond, and two corresponding cathode currents $I_{K1}$ and $I_{K2}$ are defined as reference values—corresponding to the circuit concept used. Values that may be used in practice are, $I_{K1}$ (as $I_{cutoff}$)≈7 . . . 15 μA and $I_{K2}$ (as $I_{Drive}$)≈15 . . . 30 μA.

Owing to the physically dependent beam-current characteristic profile $I_K$=f ($V_K$) as a function of the control voltage $V_K$ at the respective cathode of a colour tube, the following mathematical relationship may be used for the ratio of two cathode currents $I_K$, based on the two-point control system:

$$\frac{I_{K2}}{I_{K1}} = \left(\frac{V_{K2}}{V_{K1}}\right)^\gamma$$

The described two-point control system is thus based on an "assumed" exponent γ since, from the definition of the reference voltages and currents, the "theoretical" characteristic exponent is also defined uniquely from the above equation. For colour tubes that are known at present in the consumer area, the value of the exponent γ is about 2.0 to 2.4. This is subject to only relatively minor scatter for tubes with the same system design.

Assuming a constant value for the characteristic exponent γ, it is known, for example from the "One-chip TV processor" TDA 884X/885X-N1 from Philips, for a cutoff and drive control system designed as a two-point control system to define reference currents and reference voltages which respectively correspond to two different cathode currents, which are called the first and second reference cathode currents, $I_{K1}$ and $I_{K2}$, respectively, in the following text. Since, in practice, an IC concept can be used with widely differing tube types, it has been found, however, that, if the value for the characteristic exponent γ or for the voltage ratio $V_{K1}/V_{K2}$ is assumed or defined, it is not always possible to achieve an optimum result for displaying monochrome pictures.

SUMMARY OF THE INVENTION

The object of the invention is thus to specify a method for cutoff and drive control, using which an optimum result can be achieved for all colour tubes.

This object is achieved by the invention specified below.

A further object of the invention is to provide a video processor having a control device for cutoff and drive control, by means of which an optimum result can be achieved for all colour tubes.

This object is achieved by the invention specified below.

The invention is based on the recognition that a cutoff control system which is based on an assumed exponent γ which does not correspond to the actual tube exponent γ is unable to control the black levels of the RGB signals such that they are coincident with the cutoff points of a colour tube. Thus, for example, an actual tube exponent γ, which differs from the assumed exponent γ, is compensated for by a DC offset (that is to say corresponding to a cutoff error) and a drive offset (that is to say corresponding to a gain error).

The invention is based on the idea, in a video processor having a control device of the type mentioned above, of automatically matching the value (which until now has been assumed in the control algorithm) for the exponent γ to the actual exponent γ of the respective colour tube. Specifically, if the actual value of the exponent γ in an RGB colour channel in the colour tube used differs from the assumed value on which the cutoff and drive control is based, then both control loops will compensate for this discrepancy, which is interpreted as an error, in accordance with the mathematical relationship $$\frac{I_{K2}}{I_{K1}} = \left[\frac{(v_{1f} \times u_2 + u_0) \times v_2 - C_{00}}{(v_{1f} \times u_1 + u_0) \times v_2 - C_{00}}\right]^\gamma$$

via a DC voltage offset $u_{0f}$ and a gain matching factor Δv, where γ is the actual value of the tube exponent and $v_1 f$ is the gain adapted by Δv (called the erroneous gain in the following text), while $u_1$ and $u_2$ are measurement signal voltages, generated in the respective RGB colour channel of the video processor, for the two measurement lines (cutoff and drive) which,—in accordance with the description below—amplified by the erroneous gain $v_1 f$ and shifted by a DC voltage offset called the total DC voltage offset $u_0$ in the following text, occur at an RGB colour signal output of the video processor. As a consequence of further amplification, called the gain $v_2$ in the following text, by the output amplifier stage (which is known per se) in the respective RGB colour channel, the measurement signal voltages $u_1$ and $u_2$ and the total DC voltage offset $u_0$ are amplified further before they reach the correspondingly associated tube cathode (FIG. 1b). Coo denotes an operating-point-dependent voltage offset of the actual cutoff point $C_0$ of a tube system in the colour tube. In principle, this forms a difference (FIG. 2b), between the black level of the RGB signal at the output of an output amplifier stage, and the actual cutoff point $C_0$ of the corresponding tube system, which difference is compensated for, by means of the cutoff control system, with a corresponding DC voltage offset $u_{00}$. This DC voltage offset $u_{00}$ and the $\gamma$-dependent DC voltage offset $u_{0f}$ are taken into account—as corresponding elements—in the total DC voltage offset $u_0$ mentioned above.

To explain the control algorithm further, this relationship is rewritten in the form $$\frac{I_{K2}}{I_{K1}} = \left[\frac{(v_{1f} \times u_2 + u_0) \times v_2 - C_{00}}{(v_{1f} \times u_1 + u_0) \times v_2 - C_{00}}\right]^\gamma = \left[\frac{(v_{1f} \times n_f \times u_1 + u_0) \times v_2 - C_{00}}{(v_{1f} \times u_1 + u_0) \times v_2 - C_{00}}\right]^\gamma$$

where $n_f$ is the erroneous ratio of the amplitudes of the measurement signal voltages $u_1$ and $u_2$ of the two measurement lines of an RGB colour signal. According to the prior art, the ratio n (and $n_f$ if $\gamma$ is not correct) of the measurement signal voltages $u_1$ and $u_2$ is defined in a fixed manner.

If all three colour channels were identical, then, if there were a difference between the assumed exponent $\gamma$ and the actual control characteristic $I_K=f(V_K)$ of the respective tube system of the colour tube, the picture would admittedly have neutral colours, but the consequence would be that the signal black levels would no longer coincide with the cutoff points of the tube systems, and the signal white levels would differ from the desired amplitude by an extent that would increase as a function of the extent to which they were greater than the amplitudes of the drive measurement lines.

The invention makes use of the knowledge that, with an assumed or defined exponent $\gamma$ and the definition of the two reference cathode currents $I_{K1}$ and $I_{K2}$ in conjunction with a cutoff and drive control system which is designed as a two-point control system, it is not possible to identify directly whether the respective measurement signal voltages (which can be measured at the video processor colour channel outputs) of the cutoff measurement lines and of the drive measurement lines have a DC voltage offset $u_0$ and/or a gain matching factor $\Delta v$, since, irrespective of whether the assumed value of the exponent $\gamma$ is or is not matched to the actual exponent $\gamma$, correction takes place to the reference cathode currents $I_{K1}$ and $I_{K2}$ (that is to say at least as long as the system remains in the control range).

Based on the previous relationship $$\frac{I_{K2}}{I_{K1}} = \left[\frac{(v_{1f} \times n_f \times u_1 + u_0) \times v_2 - C_{00}}{(v_{1f} \times u_1 + u_0) \times v_2 - C_{00}}\right]^\gamma$$

the matching of the assumed value for the exponent $\gamma$ of the video processor to the respective control characteristic of the colour tube—and thus the position of the signal black level at the cutoff point (corresponding to $U_{cutoff}$) of the respective tube system—is achieved, according to the invention, by adaptation of the gain $v_1$, of the amplitude ratio n of the measurement signal voltages $u_1$ and $u_2$ of the two measurement lines, and of the total DC voltage offset $u_0$ in the respective RGB colour channel, such that, at the end of the matching process, the exponent $\gamma$ corresponds not only to the value of a tube system in the colour tube determined according to the invention, but also to the actual value. Thus, in principle, any residual total DC voltage offset $u_0$ in this case corresponds to an operating—point-dependent DC voltage offset $C_{00}$.

The actual exponent $\gamma$ (which can be determined, according to the invention, in conjunction with a colour tube which will be used) is determined, for example, in the appliance manufacturing process in that, during an initialization process provided for this purpose for each RGB colour channel, an exponent determination is firstly carried out and—subject to definition of a third reference cathode current $I_{K3}$ and the calculation and setting of a third reference signal voltage $u_3$ (related, for example, to the measurement signal voltage $u_1$) on the basis of the relationship $$\frac{I_{K3}}{I_{K1}} = \left[\frac{(v_1 \times u_3 + u_0) \times v_2 - C_{00}}{(v_1 \times u_1 + u_0) \times v_2 - C_{00}}\right]^\gamma$$

—its correspondence to the actual exponent $\gamma$ is then checked and, if necessary, is optimized by one or more further changes to the abovementioned amplitude ratio n or $n_f$, respectively, and to the abovementioned gain $v_1$ or $v_{1f}$, respectively, where $I_{K3}$ is the value (which results during the setting of the third reference signal voltage $u_3$) for the third reference cathode current $I_{K3}$.

In the case of a video processor, to which appropriate devices and a data bus can be added, of the same type as the said "One-chip TV processor" TDA 884X/885X-N, the optimum exponent, and thus the actual respective exponent, of the colour tube to be used can be determined in an advantageous manner not only by the process according to the invention for matching the video processor to this tube but also with the aid of a microprocessor which is used in any case in present-day television sets. In this way, the video processor can be automatically matched to any required tube characteristic. On the other hand, the invention can also be implemented completely in an appropriately designed video processor.

The respective exponent $\gamma$ determined in this way as well as the amplitude ratio n (which results in the respective RGB colour channel at the end of the matching process) of the two respective measurement lines of an RGB colour channel and the gain $v_1$ that results in this case are stored in the video processor or other suitable memories as operating parameters for the control algorithm for cutoff and drive control. This can be achieved in a simple manner, for example by providing means for reading and overwriting in the video processor.

In this way, even relatively large scatters, in particular those caused by different colour tube types, can be compensated for relatively easily and automatically in an advantageous manner.

The invention will be explained in more detail with reference to an exemplary embodiment.

DETAILED DESCRIPTION

Figure 1A:
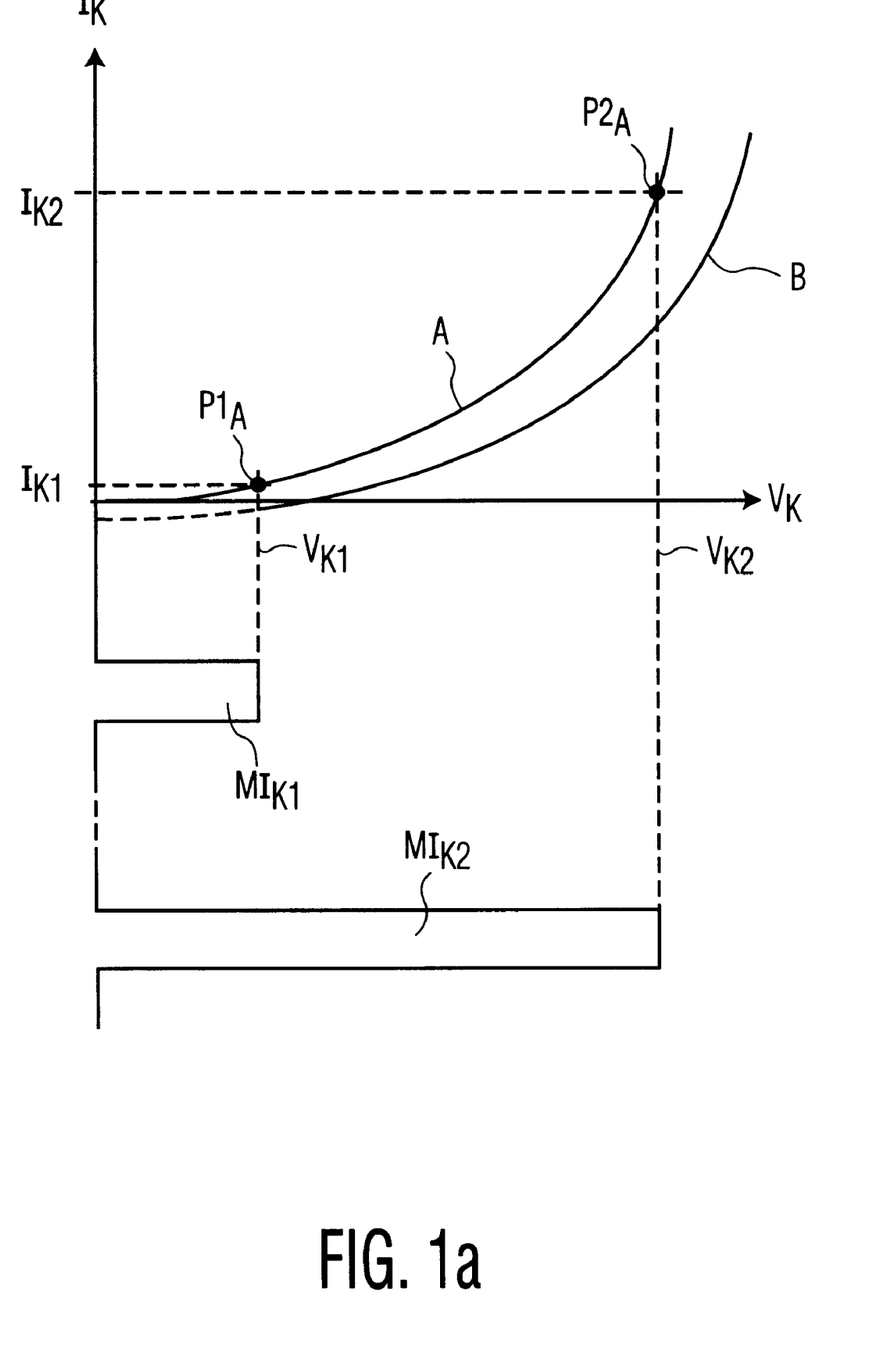
FIGS. 1a–1c show graphs with a portion of the cathode current profile of two different colour tubes as a function of the respective cathode control voltage.
Figure 1B:
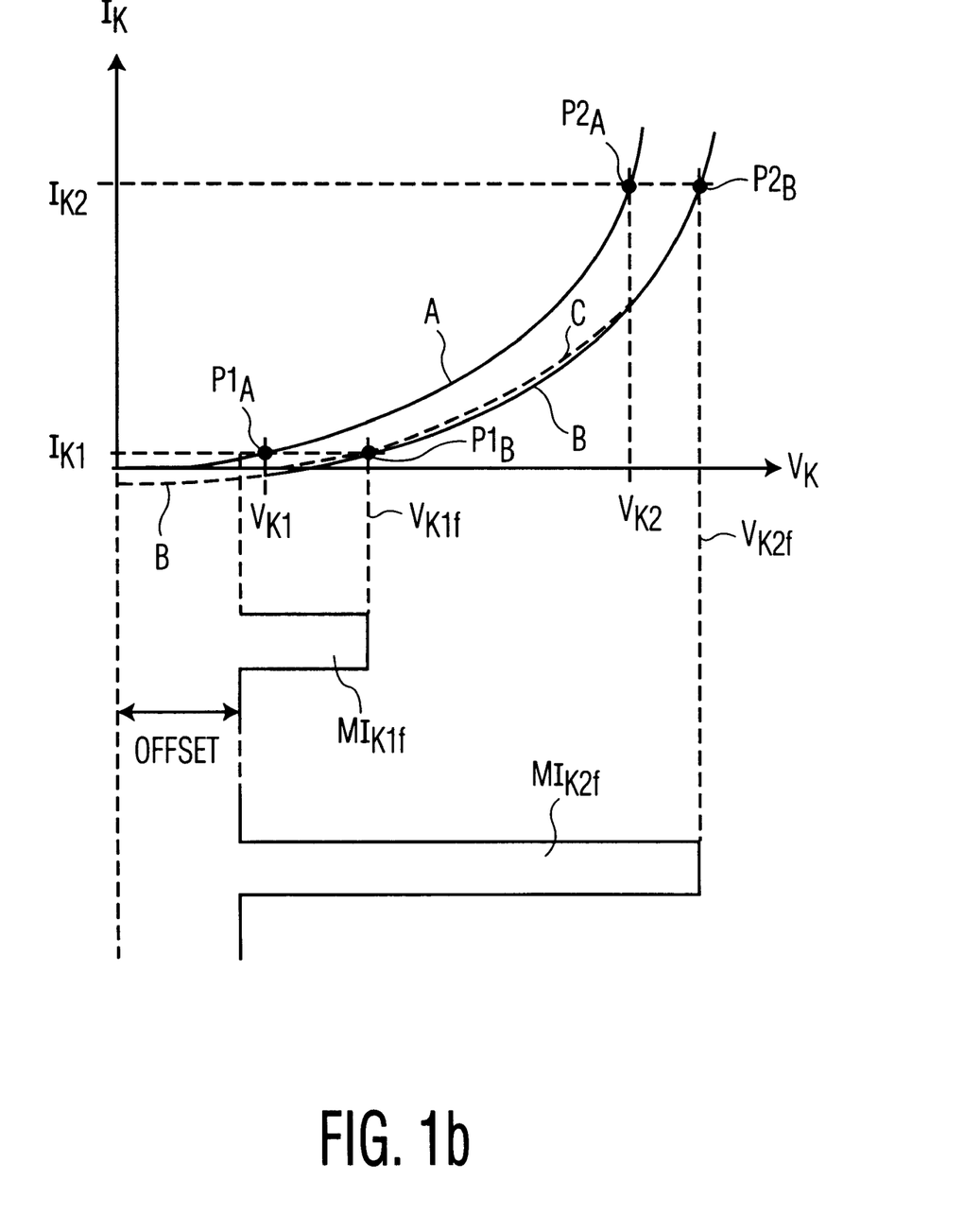

FIG. 1a uses a graph to illustrate schematically the respective characteristic profile of the cathode current $I_K$ of a tube system having two different colour tubes 1, for relatively small beam currents, as a function of the cathode control voltage $V_K$. The respective characteristic profile is also known as the control characteristic $I_K=f(U_{G1})$ (or in this case $I_K=f(V_K)$ in accordance with previous mathematical relationships), where $U_{G1}$ is the respective voltage at the modulator electrode G1. Such a profile may also exist between the tube systems, called the systems in the following text, of a colour tube 1.

Figure 2A:
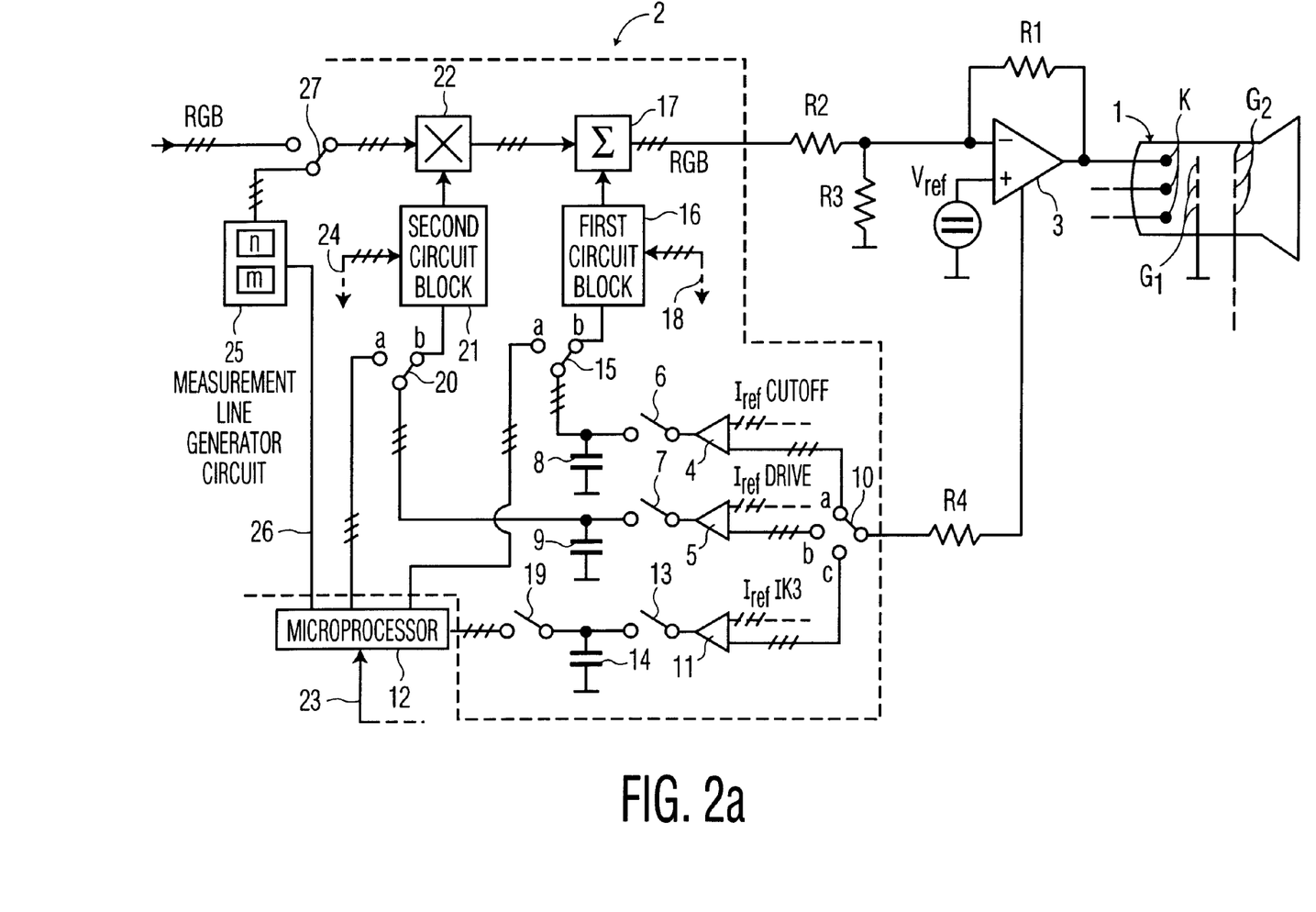
FIG. 2a shows a circuit detail with a control device for cutoff and drive control.
Figure 2B:
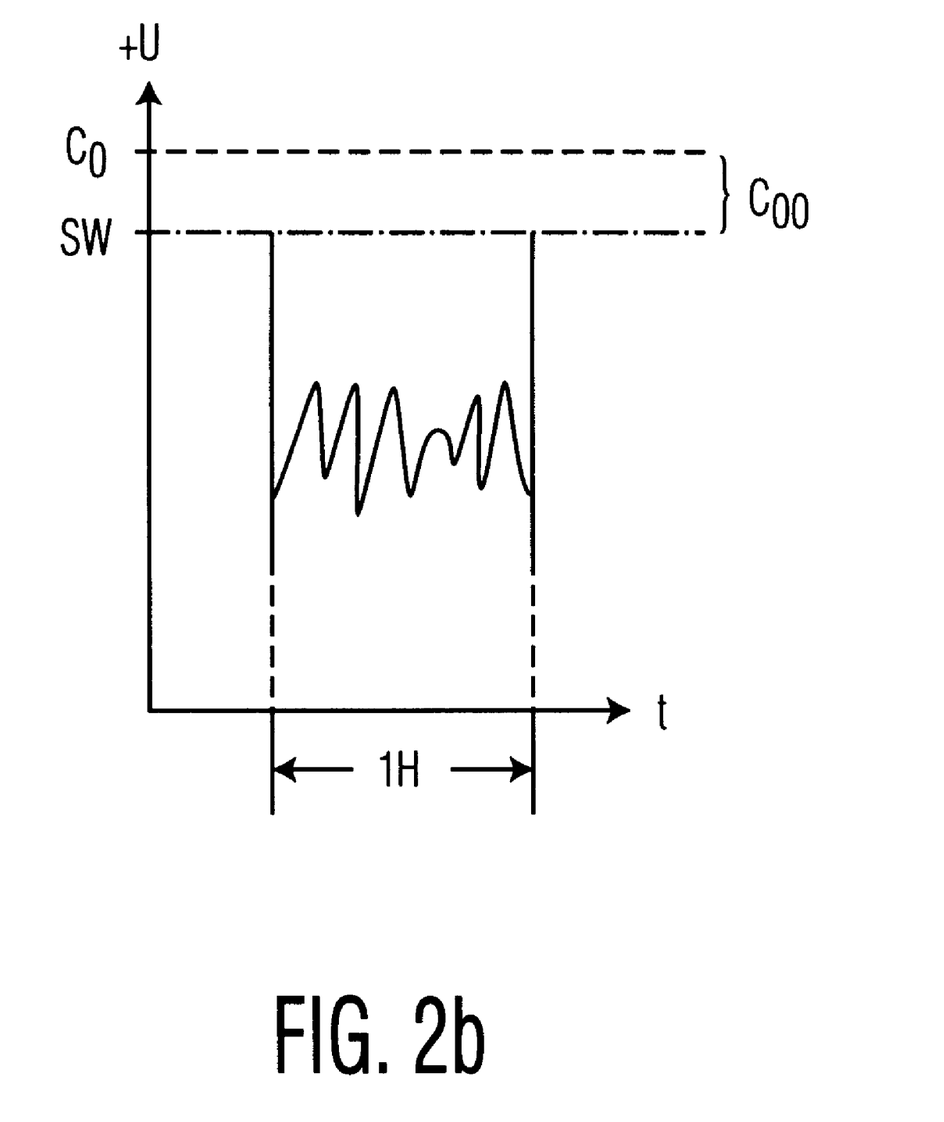
FIG. 2b shows an illustration in the form of a graph of voltages at a cathode of a colour tube.

The characteristic A is intended to be that of a colour tube 1 (FIG. 2a) which can be driven by a video processor 2, illustrated in FIG. 2a, having a cutoff drive control system designed as a two-point control system, and in which operating parameters used for the algorithm for these control systems in the respective RGB colour channel—such as, in particular, the gain $V_1$ and the amplitude ratio n of the measurement lines to one another—are intended to be matched to the correspondingly associated control characteristic $I_K=f(V_K)$ of a system. For cutoff control in this case, a first point $P1_A$, which is intended to represent a so-called artificial black level, on the characteristic A is assigned a first cathode control voltage $V_{K1}$ (close to the cutoff point) and a first reference cathode current $I_{K1}$.

Furthermore, with a correspondingly greater drive level for the drive control system, a second point $P2_A$ on the characteristic A is assigned a second cathode control voltage $V_{K2}$ and a second reference cathode current $I_{K2}$. The characteristic A in this case also represents the nominal profile. This characteristic A is at the same time also intended to correspond to the control characteristic $I_K=f(V_K)$, with the black level of a colour signal, called the RGB signal in the following text, in each case being at the cutoff point of a tube system in the colour tube 1, to which, for the sake of simplicity in the graph, the coordinate origin is intended to correspond.

On the other hand, the characteristic B is intended to be that of a colour tube 1 having a different value for the exponent γ (or that of a colour tube which—with regard to γ—has different systems) so that its control characteristics $I_K=f(V_K)$ have a different possible profile. As a result of the video processor 2 being driven by an exponent γ or operating parameters which is or are not matched to the respective control characteristic $I_K=f(V_K)$ for this colour tube 1, then, as shown in FIG. 1b, the cutoff control results in a first point $P1_B$ on the characteristic B being assigned the first reference cathode current $I_{K1}$, and a first cathode control voltage $V_{K1f}$ which, however, differs from the previous first voltage. According to FIG. 1b, as a result of a correspondingly greater drive level for the drive control system, a second point $P2_B$ on the characteristic B is assigned the reference cathode current $I_{K2}$ and a second cathode control voltage $V_{K2f}$ which, however, differs from the previous second voltage.

In FIG. 1b, a dashed line C is furthermore used to illustrate schematically the profile including the control process. As already mentioned, such a characteristic profile can result for cutoff and drive control on the basis of the assumption of an incorrect value for the respective tube exponent γ; specifically, if the actual value of the exponent of the respective tube system for the colour tube 1 that is used differs from the assumed value, then the cutoff and drive control system will compensate for this error via a corresponding γ-dependent DC voltage offset $u_{of}$ and a gain matching factor Δv.

Both reference cathode currents $I_{K1}$ and $I_{K2}$ correspond to schematically illustrated measurement pulses $MI_{K1}$, $MI_{K2}$ (FIG. 1a) and $MI_{K1f}$, $MI_{K2f}$ (FIG. 1b), in which case the measurement pulses $MI_{K1}$ and $MI_{K1f}$ which are assigned to the first reference cathode $I_{K1}$ are used to obtain the controlled variable for the cutoff control system, and the measurement pulses $MI_{K2}$ and $MI_{K2f}$ which are assigned to the second reference cathode current $I_{K2}$ are used to obtain the controlled variable for the drive control system. Such measurement pulses occur in the cutoff and drive control system, that is to say preferably sequentially for all three RGB colour channels within measurement lines which are provided in the respective vertical frame blanking interval and which can be generated, in a manner known per se, in such a video processor 2. On the basis of the profile of the characteristic represented by the dashed line C, the measurement pulses $MI_{K1f}$, $MI_{K2f}$ are represented with a total DC voltage offset ($v_2 \times u_0$)—in this case being raised, for example—with a gain which is changed in an appropriate manner in this case. That is to say, both measurement pulses $MI_{K1f}$, $MI_{K2f}$ correspond, according to the already explained relationship $$\frac{I_{K2}}{I_{K1}} = \left[\frac{(v_{1f} \times u_2 + u_0) \times v_2 - C_{00}}{(v_{1f} \times u_1 + u_0) \times v_2 - C_{00}}\right]^\gamma,$$

to measurement signal voltages $u_1$ and $u_2$ (shifted by a total DC voltage offset $u_0$ and amplified by a gain $v_{1f}$ which is erroneous owing to the cutoff and drive control system) of the two measurement lines (cutoff and drive) at an RGB signal output of the video processor 2. Owing to the amplification $v_2$ by an output amplifier stage 3 (FIG. 2a), which is known per se, in the respective RGB colour channel, these then, together with the total DC voltage offset $u_0$, form the control voltages $V_{K1f}$ and $V_{K2f}$ at a cathode K of the colour tube 1.

Since, for the sake of simplicity, the coordinate origin in the graph shown in FIG. 1b is once again intended to correspond to the cutoff point of a tube system, it should be mentioned in this context that—owing to the simplified representation—the total DC voltage offset $u_0$ corresponds to the element of a γ-dependent DC voltage offset $u_{0f}$.

$C_{00}$ denotes an operating-point-dependent voltage offset of the actual cutoff point $C_0$ of a tube system in the colour tube 1. As has likewise already been explained and is represented schematically by a video line H in the graph shown in FIG. 2b, this offset corresponds to a difference (that is to say with an element $u_{00}$ on the total DC voltage offset $u_0$), which is to be compensated for by the cutoff control system, between the black level of the RGB signal at the output of an output amplifier stage 3, and the actual cutoff point $C_0$ of the corresponding system of the colour tube 1.

The voltage offset $C_{00}$ results from the fact that, on the one hand, an RGB signal which is emitted at a signal output RGB of the video processor 2 has a specific DC voltage offset and is amplified further in the downstream output amplifier stage 3 using a reference voltage $V_{ref}$ (FIG. 2a), by means of which the operating point of an output amplifier stage 3 is defined in a known manner and is matched, in terms of DC voltages, to the corresponding colour signal output RGB of a video processor. This results—that is to say depending on the abovementioned DC voltage offset of an RGB signal at a signal output of a video processor, of the reference voltage $V_{ref}$ and of the gain $v_2$—in a specific DC voltage level and a specific voltage potential for the black level of the RGB signal at the signal output of the output amplifier stage 3. On the other hand, the screen grid voltage $U_{G2}$ is in principle trimmed to set the cutoff points of a colour tube 1 such that they correspond as far as possible to the black level at the cathodes K. It is thus possible for such a difference to occur between the black level of the RGB signal at the output of an output amplifier stage and the associated cutoff point $C_0$ of the corresponding tube system.

Based on a relationship which has likewise already been explained:

$$\frac{I_{K2}}{I_{K1}} = \left[\frac{(v_{1f} \times n_f \times u_1 + u_0) \times v_2 - C_{00}}{(v_{1f} \times u_1 + u_0) \times v_2 - C_{00}}\right]^\gamma = \left[\frac{(v_1 \times n \times u_1 + u_0) \times v_2 - C_{00}}{(v_1 \times u_1 + u_0) \times v_2 - C_{00}}\right]^\gamma = \left(\frac{v_{K2f}}{v_{K1f}}\right)^\gamma = \left(\frac{v_{K2}}{v_{K1}}\right)^\gamma$$

Figure 1C:
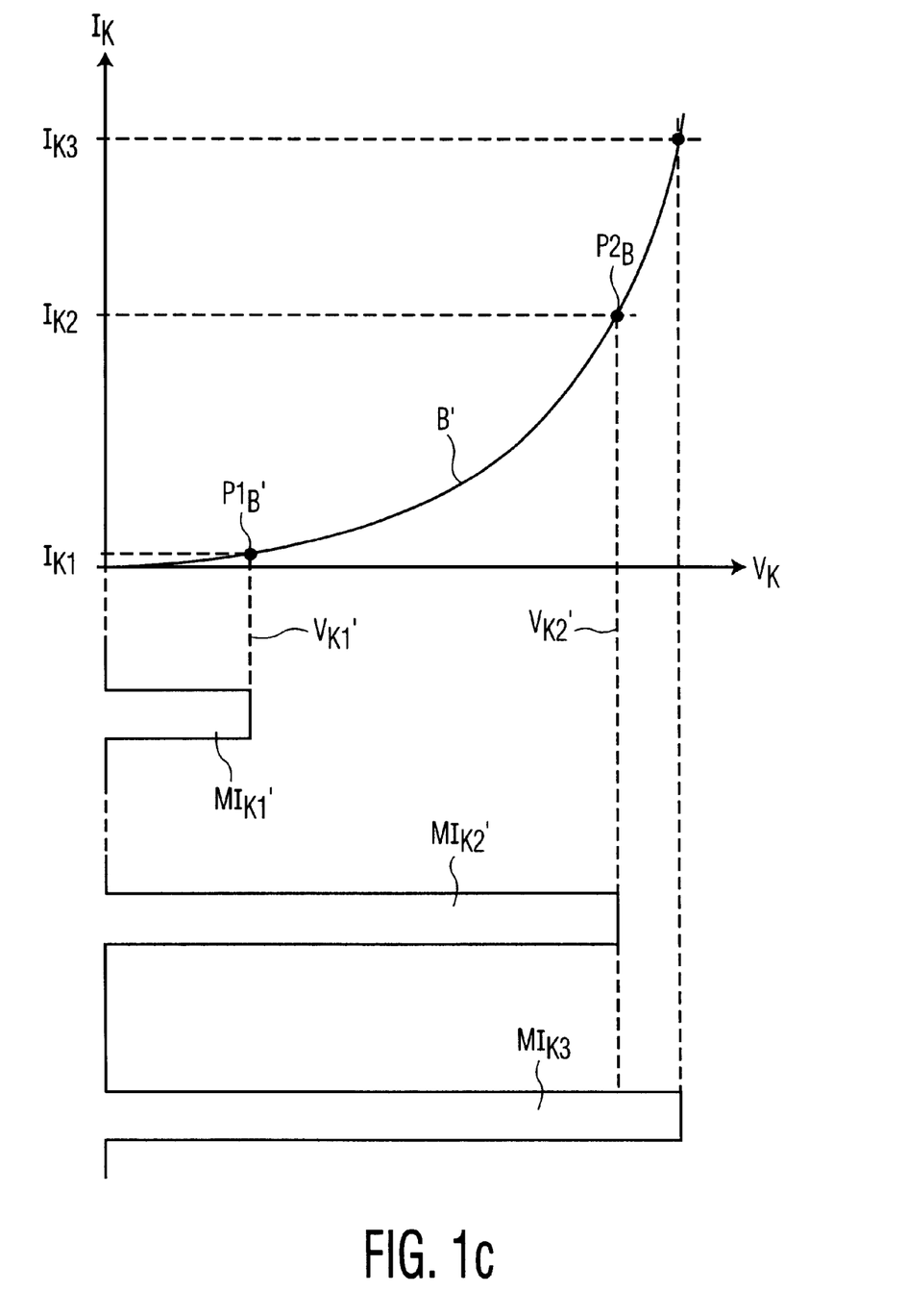

FIG. 1c shows a characteristic B' which is matched, according to the invention, to the characteristic B. Owing to the matching process—according to a first characteristic point $P1_B'$—the first reference cathode $I_{K1}$ is assigned a corresponding first cathode control voltage $V_{K1}'$ and—according to a second characteristic point $P2_B'$—the second reference cathode current $I_{K2}$ is assigned a corresponding second cathode control voltage $V_{K2}'$. As a result of the matching, the black level of an RGB signal now coincides exactly with the cutoff point of the corresponding system in the colour tube 1, to which, for the sake of simplicity in this graph, the coordinate origin is also intended to correspond. Furthermore, FIG. 1c shows a measurement pulse $MI_{K3}$, which is injected during an initialization mode (provided according to the invention) for the television receiver, which is not shown.

FIG. 2a uses a circuit detail in the form of a block diagram to show the principle of a circuit which processes video signals and has a video processor 2, for example of the "One-chip TV processor" TDA 884X/885X-N1 type mentioned initially, which—together with output amplifier stages 3 which are known per se and are designed as operational amplifiers for amplification of the RGB signals—forms control devices for cutoff and drive control in the respective RGB colour channel. The control of the colour tube 1 with the RGB signals is in this case preferably carried out via its cathodes K, with the modulator electrodes G being at a reference-earth potential. The screen grids G2, which are electrically connected to one another, are set to a common, positive voltage potential $U_{G2}$, owing to the screen grid trimming.

A first output (which carries an RGB signal) of the respective output amplifier stage 3, which in each case has negative feedback provided by a resistor R1 arranged between its inverting input and its first output, is connected to a cathode K of the colour tube 1, The inverting input of the respective output amplifier stage 3 at the same time forms a signal input, which is connected via a resistor R2 to a colour signal output RGB of the video processor 2. The inverting input of the respective output amplifier stage 3 is furthermore connected by means of a resistor R3 to the reference-earth potential. The non-inverting signal input of the respective output amplifier stage 3 is connected to a reference voltage source $V_{ref}$ by means of which, as is known, the operating point of the output amplifier stage in an RGB colour channel is defined.

A second output (carrying an RGB signal) of the respective output amplifier stage 3 is provided for the cutoff and drive control system. This output is connected via a resistor R4 to the video processor 2, so that a control loop for cutoff control and a control loop for drive control are in each case formed, in a manner known per se, per RGB colour channel, in which case measurement currents, which correspond to the measurement pulses $MI_{K1}$, $MI_{K2}$; $MI_{K1}'$, $MI_{K2}'$ and to the measurement pulses $MI_{K1f}$, $MI_{K2f}$ shown with a DC voltage offset, are supplied during the vertical frame blanking period from the second RGB signal output of the output amplifier stage 3 to a first (4) and, respectively, a second (5) measurement device in the video processor 2, and are compared with a first reference current $I_{ref,cutoff}$ and, respectively, a second reference current $I_{ref,drive}$, in order to produce corresponding manipulated variables which are stored via a first switch 6 (which can be controlled by a microprocessor 12) and, respectively, via a second switch 7 (which can be controlled by the microprocessor 12) in a first storage capacitor 8 and, respectively, a second storage capacitor 9. The respective measurement current is in this case supplied by means of a first switch 10, which can be controlled by the microprocessor 12 and shows the position, for example, for cutoff control and, when the television receiver is in the normal mode n, can be controlled by corresponding control signals derived from line and/or frame synchronization signals, for example via an OR circuit that is not illustrated.

Furthermore, a third measurement device 11 is provided according to the invention for the respective RGB colour channel. With such a third measurement device 11, it is possible in the initialization mode of the appliance to monitor the matching of the operating parameters for an RGB colour channel of the video processor 2 to the exponent γ and to the corresponding control characteristic $I_K = f(V_K)$ of the colour tube 1, by comparing a measurement current (which corresponds to the third measurement pulse $MI_{K3}$) with a third reference current $I_{ref,IK3}$ in order to produce a corresponding measured value at the output of the third measurement device 11 for the matching process. The measurement current is in this case supplied via the first switch 10, which is controlled via the OR circuit by the microprocessor 12 in the initialization mode, which microprocessor 12 also has means for arithmetic operations and, for example, may at the same time be designed as a control section processor for the appliance. This measured value is stored in a third storage capacitor 14, via a third switch 13 which can be controlled by the microprocessor 12.

The manipulated variable stored in the first storage capacitor 8 can be supplied via a second switch 15 (which can be controlled by the microprocessor 12) and a first circuit block 16 to an addition circuit 17 in order that—corresponding to the cutoff control system—the RGB signal supplied to a corresponding signal output RGB of the video processor 2 can have a total DC voltage offset $u_0$ added to it, as in the case of a control error with respect to a measurement pulse associated with the corresponding first reference cathode current $I_{K1}$, to a difference ($C_{00}$), to be compensated for by the cutoff control system, between the black level of the RGB signal at the output of an output amplifier stage and the actual cutoff point $C_0$ of the corresponding tube system and/or to a basis of an incorrect exponent γ for a video processor 2 according to the knowledge of the present invention.

The first circuit block 16 essentially contains (in addition to a controllable supply means, which can be controlled by the microprocessor 12 but is not shown, for supplying the total DC voltage offset $u_0$ to the addition circuit 17) controllable adjustment and storage means, which are not illustrated, for adjusting and varying the total DC voltage offset $u_0$ in the initialization mode. When switching between the normal mode and the initialization mode in the respective RGB colour channel, the supply means and the adjustment and storage means are controlled by the microprocessor 12 via a data and control line 18. The adjustment or change to the total DC voltage offset $u_0$ in the respective RGB colour channel in the initialization mode is carried out by the microprocessor 12 on the basis of an evaluation of the measured value which can be stored in the third storage capacitor 14, which evaluation can be supplied to the microprocessor 12, preferably via a fourth switch 19 which can be controlled by the microprocessor 12.

The manipulated variable which is stored in the second storage capacitor 9 can be supplied via a third switch 20, which can be controlled by the microprocessor 12, and a second circuit block 21, for example to a multiplier circuit 22 in order—corresponding to the drive control system—to allow gain matching $\Delta v$ to be carried out for the RGB signal supplied to a corresponding signal output RGB of the video processor 2, as in the case of a control error with respect to the second reference cathode current $I_{K2}$. The multiplier circuit 22 and the addition circuit 17 are each arranged in the course of the RGB signal path of the respective RGB colour channel.

The second circuit block 21 essentially contains, for example, in addition to a supply means which can be controlled by the microprocessor 12 but is not shown (for supplying manipulated variables to the multiplier circuit 22 on the one hand for drive control and on the other hand for the initialization mode), adjustment and storage means, which can be controlled and adjusted by the microprocessor 12 but are not shown, for adjusting, changing and storing a reference value (which corresponds, for example, to the gain $(v_1)$ of the multiplier circuit 22) in the initialization mode.

To this end, a measured value (which can be produced by the first measurement device 14 in the initialization mode) is evaluated by the microprocessor 12, in which case, on the basis of the evaluation, the reference value for the gain $(v_1)$ of the multiplier circuit is adjusted or changed. The measured value to be evaluated is in this case supplied to the microprocessor 12 via the second switch 15 which can be controlled by the microprocessor 12. The adjustment and storage of the reference value, corresponding to the gain factor $(v_1)$, in the second storage block 21 are carried out via a data and control line 24.

Controllable storage devices, for example, which operate as buffer stores, may be used as supply means in the first (16) and in the second (21) storage block.

Thus, in an initialization mode, the measured value stored in the third storage capacitor 14 and obtained with the third measurement pulse $MI_{K3}$ is transmitted to the microprocessor 12 for evaluation. As is subsequently shown in FIG. 3a, a decision is made in this case to determine whether a matching process for the operating parameters need be carried out or need be continued, or whether it is possible to switch from the initialization mode to normal operation of the appliance.

A measurement line generator circuit 25 is provided for producing the measurement pulses $MI_{K1}$, $MI_{K2}$ and $MI_{K3}$. This circuit produces corresponding measurement signal voltages $u_1$, $u_2$ and $u_3$. The measurement signal voltages $u_1$ and $u_2$ (cutoff and drive) have, as is known, a constant amplitude ratio n to one another for normal operation of the appliance.

One advantage of the invention is that the initialization mode allows the amplitude ratio n and the gain $v_1$ in the respective RGB signal path of the video processor 2 to be matched to the exponent $\gamma$ and to the corresponding control characteristic of the colour tube 1. The amplitude ratio n, and a further amplitude ratio m which is intended to characterize the ratio of the measurement signal voltages $u_1$ and $u_3$ to one another, are adjusted by the microprocessor 12 via a data and control line 26, which connects the measurement line generator circuit to the microprocessor 12, at 25. The measurement line generator circuit 25 has controllable adjustment and storage means, which are not illustrated, for adjustment and storage of the amplitude ratios m and n by the microprocessor 12.

Corresponding control lines, which are not shown, are provided for the microprocessor 12 to control the switches 6, 7, 13, 19 and the switches 10, 15, 20. The switches 6, 7 and the first switch 10 as well as a fourth switch 27, by means of which signal path switching (which is known per se) is carried out for cutoff and drive control in normal operation of the appliance, are controlled by appropriate OR circuits, which are not shown.

It should be mentioned that the term "normal operation" is also intended to cover the switching processes of the switches which take place in normal operation owing to the cutoff and drive control systems, which are, in principle, pulsed control systems.

Figure 3A:
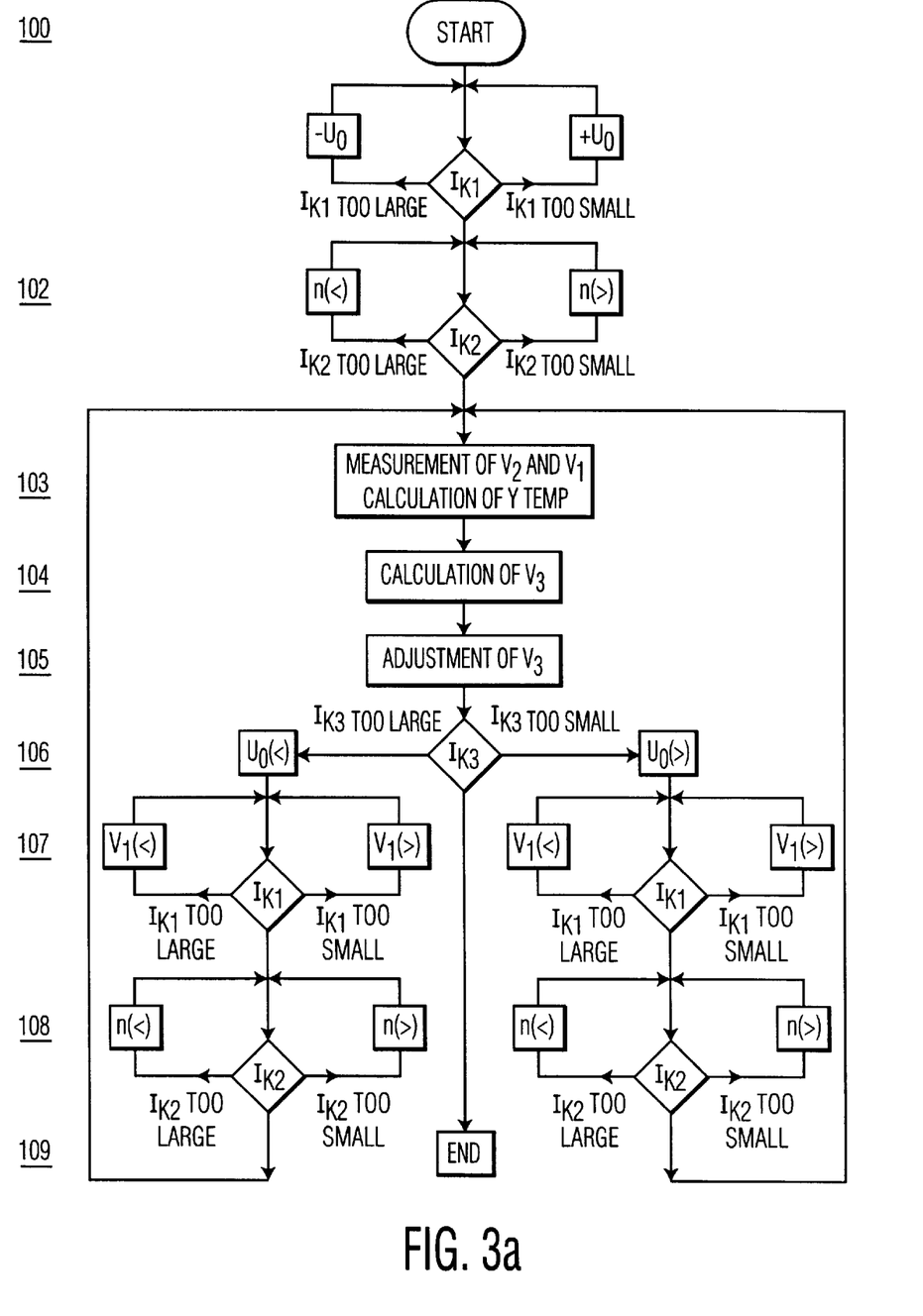
FIG. 3a shows a flowchart.
Figure 3B:
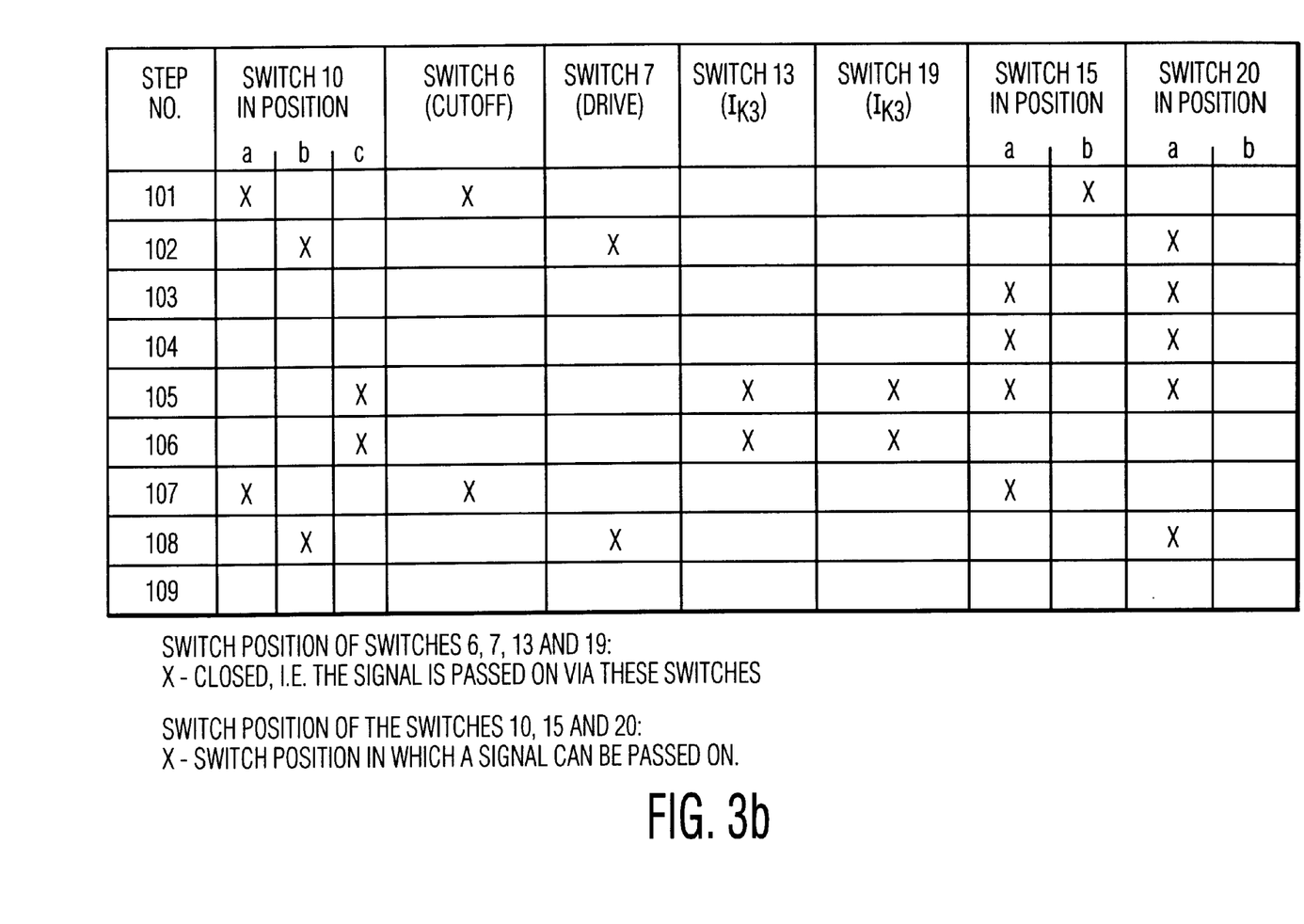
FIG. 3b shows a matrix-like representation of switch positions.

The respective switch position of the switches 6, 7, 13, 19 and the switches 10, 15, 20, 27 in an initialization mode of the appliance is shown in a matrix in FIG. 3b.

For a simpler version, that is to say without automatic measurement, a video processor 1 of the TDA 884X/885X-N1 type mentioned can be modified in such a way that appropriate data for the exponent $\gamma$ could be input via an I2C bus provided the capability to adjust the amplitude ratio n of the respective two measurement lines (cutoff and drive) is available. It would also be possible in this case to define the exponent $\gamma$ via corresponding connection at an IC pin, provided for this purpose, of the video processor 2.

The method of operation of the circuit described so far is explained in more detail in FIG. 3a. FIG. 3a uses a flowchart to show, by way of example, the sequence for determining the respective control characteristic $I_K=f(V_K)$ of the colour tube 1 that is used, with the video processor 2 being matched to it.

As a result of the "initialization" operating mode being started by the microprocessor $\mu$P in step 100—for example via an appliance keypad that is not shown—, correction to the first reference cathode current $I_{K1}$ is carried out, in the step 101, by means of the appliance cutoff control device that is shown in FIG. 2a, in which case the measurement current corresponding to the reference cathode current $I_{K1}$ is measured by the first measurement device 4 in the respective RGB colour channel. In the event of a control error, this will, in principle, be composed, according to the relationship for the first reference cathode current $I_{K1}$ $$I_{K1}=k\times[(v_1\times u_1+u_0)\times v_2+C_{00}]^\gamma,$$

which can be derived from the relationships already explained initially, of the constant measurement signal voltage $u_1$ of the cutoff measurement line (which is generated in the measurement line generator circuit 25 and is amplified by a factor $v_1$ which is, for example, preset) and—depending on the direction of the respective control error—of a total DC voltage offset $+u_0$ in the positive direction, or a total DC voltage offset $-u_0$ in the negative direction. In the above-mentioned relationship for the first reference cathode current $I_{K1}$, $v_2$ is the gain factor of the respective output amplifier stage 3, and the factor k is an operating-point-dependent system constant.

The measurement current associated with the second reference cathode current $I_{K2}$ is measured first, in step 102, in order to determine the measured value (corresponding to the second reference cathode current $I_{K2}$) at the output of the second measurement device 5 by means of the interaction of the microprocessor 12 and the second measurement device 5, in conjunction with the measured value being passed on via the second switch 7 and the third switch 20 to the microprocessor 12, and while retaining the total DC voltage offset $+u_0$ or $-u_0$ resulting from the correction to the first reference cathode current $I_{K1}$, in which case the value of this measurement current is obtained, in principle, on the basis of the, for example preset, amplitude ratio n between the measurement signal voltages $u_1$, $u_2$ of the drive and cutoff measurement line and the, for example preset, gain $v_1$ for the multiplier circuit 22. If the value of the second reference cathode current $I_{K2}$ is not reached in this case, or is exceeded, then—by interaction of the second measurement device 5, the microprocessor 12, the measurement line generator circuit 25, the multiplier circuit 22, the addition circuit 17 and the output amplifier stage 3 as the control loop, in accordance with the relationship for the second reference cathode current $I_{K2}$ $$I_{K2}=k\times[(v_1\times n\times u_1+u_0)\times v_2+C_{00}]^\gamma,$$

which can likewise be derived from the relationships mentioned initially—the amplitude ratio n is set or changed, instead of gain matching, as a function of the direction of the respective error, in such a manner that correspondence with the second reference cathode current $I_{K2}$ is achieved, in which case n(>) symbolizes that the preset amplitude ratio n must be increased, and n(<) symbolizes that the preset amplitude ratio n must be reduced. The corresponding evaluation of the measured value (determined by the second measurement device 5) for the second reference cathode current $I_{K2}$ and the adjustment of the amplitude ratio n are carried out automatically by means of the microprocessor 12, that is to say the microprocessor 12 in this case also acts as a regulator at the same time. The adjustment is in this case carried out via the data and control line 26.

On the basis of the relationship $$\frac{I_{K2}}{I_{K1}}=\left(\frac{V_2}{V_1}\right)^\gamma$$

the value of an exponent γ, called the temporary exponent $\gamma_{temp}$ in the following text, is calculated in accordance with the following relationship $$\gamma_{temp}=\frac{\log\frac{I_{K2}}{I_{K1}}}{\log\frac{V_2}{V_1}}$$

in the step 103 by means of the microprocessor 12 using the signal voltages $V_1$ and $V_2$, which correspond respectively to the first ($I_{K1}$) and second ($I_{K2}$) reference cathode current, are preferably derived from the cathode control voltages $V_{K1}$ and $V_{K2}$ which result in this case (for example by means of a voltage divider (which is not shown) at the first RGB signal output of the respective output amplifier stage 3), and can be supplied to the microprocessor 12 via a measurement line 23. The respective exponent $\gamma_{temp}$ determined in this way is used, according to the invention, for calculating and adjusting a third signal voltage $V_3$, which is associated with the third reference cathode current $I_{K3}$ However, instead of the third signal voltage $V_3$, a third cathode current $I_{K3}$ may also be used and/or calculated and set, to which a corresponding reference signal voltage $V_3$ is assigned.

Using the third signal voltage $V_3$, which is calculated in step 104 in accordance with the relationship $$V_3=V_1\times\gamma_{temp}\sqrt{\frac{I_{K3}}{I_{K1}}}$$

and can be adjusted in step 105 on the voltage divider at the first RGB signal output of the respective output amplifier stage 3, the locus of the respective operating parameters n and $v_1$ of the video processor 2 are determined, and if necessary adapted, with respect to the control characteristic $I_K=f(V_K)$ of the colour tube 1 that is used. The adjustment of the third signal voltage $V_3$ is carried out by the microprocessor 12 via appropriate adjustment of the amplitude ratio m in the measurement line generator circuit 25, by means of corresponding adjustment of the measurement signal voltage $u_3$.

A corresponding value for the third reference cathode current $I_{K3}$ is obtained from the setting of the third signal voltage $V_3$, is determined using the third measurement device 11, and is evaluated by the microprocessor 12. The measured value which is determined by the third measurement device 11 is supplied to the microprocessor 12 via the fourth controllable switch 19. However, for the invention, all that is necessary is to determine in the question in step 106 whether the third reference cathode current $I_{K3}$ has in this case been undershot or exceeded. As can be shown, for example on the basis of the relationship $$V_3=V_1\times\gamma_{temp}\sqrt{\frac{I_{K3}}{I_{K1}}}$$

by a comparison of the value of the signal voltage $V_3$, which has been calculated using the previously determined value of the exponent γ or $\gamma_{temp}$, with the value of the signal voltage $V_3$ which would be produced from the calculation using the actual exponent γ of the control characteristic for the colour tube being used, the confirmation as to whether the third reference cathode current $I_{K3}$ has been undershot or exceeded can be used as an indicator as to whether the determination of the third signal voltage $V_3$—on the basis of the correction to the first reference cathode current $I_{K1}$ carried out in step 101—was based on an excessively large $(+u_0)$ or an excessively small $(-u_0)$ total DC voltage offset $u_0$.

If, on the basis of the question in step 106, the value for the third reference cathode current $I_{K3}$ has not been reached, then—as is shown on the left-hand side in the further profile of the graph—the total DC voltage offset $u_0$ which was produced on the basis of the correction in step 101 and has been buffer-stored in the first circuit block 16 is, according to the invention, reduced by the microprocessor 12 by an amount $-\Delta u_0$, which can be predetermined, in which case $u_0(<)$ symbolizes the reduction which must be carried out in the total DC voltage offset $u_0$.

However, if, on the basis of the question in step 106, the value for the reference cathode current $I_{K3}$ has been exceeded, then—as shown on the right-hand side in the further profile of the graph—the total DC voltage offset $u_0$ produced on the basis of the correction in step 101 is, according to the invention, increased by the microprocessor 12 by an amount $+\Delta u_0$ which can be predetermined, in which case $\Delta u_0(>)$ symbolizes the increase which must be carried out in the total DC voltage offset $u_0$.

A change to the characteristic of the video processor 1 is obtained as a result of the change in the amplitude ratio n in step 102 and the reduction or increase (in step 106) of the DC voltage offset $u_0$ resulting from the correction in step 101.

As is shown on the left-hand side—and on the right-hand side, which is in principle the same—of the further profile of the graph, a correction to the first reference cathode current $I_{K1}$ is then carried out once again in step 107 on the basis of the relationship $$I_{K1}=k\times[(v_{1}\times u_{1}+u_{0})\times v_{2}+C_{00}]^{\gamma temp}$$

—by means of the interaction of the first measurement device 4, the microprocessor 12, the measurement line generator circuit 25, the multiplier circuit 22, the addition circuit 17 and the output amplifier stage 3 as the control loop—in which case—instead of cutoff control—the gain factor $v_1$ for the multiplier circuit 22 and, respectively, a corresponding reference value for the gain $v_1$ are, respectively, increased or reduced in such a manner that correspondence with the value of the first reference cathode $I_{K1}$ is achieved, in which case $v_1(>)$ or $v_1(<)$, respectively, symbolizes the increase or reduction, respectively, which must be carried out to the gain factor $v_1$. The microprocessor 12 in this case acts as a regulator. The measured value which is determined using the first measurement device 4 and is to be evaluated by the microprocessor 12 is in this case supplied via the second controllable switch 15. The adjustment to be carried out on the basis of the evaluation by the microprocessor 12, or a change to the reference value for the gain $v_1$ in the second circuit block 21 to be carried out in a corresponding manner, is carried out via the data and control line 24.

As soon as the question in step 107 results in correspondence, a correction is once again carried out (according to step 108) to the second reference cathode current $I_{K2}$—by means of the interaction of the second measurement device 5, the microprocessor 12, the measurement line generator circuit 25, the multiplier circuit 22, the addition circuit 17 and the output amplifier stage 3 as the control loop—in which case, once again—instead of the gain $v_1$—the amplitude ratio n of the measurement signal voltages $u_2$ and $u_1$ of the two measurement lines (cutoff and drive) is increased ($n(>)$) or, respectively, reduced ($n(<)$) by changing the signal voltage $u_2$, in such a manner that correspondence is also achieved with the value of the second reference cathode current $I_{K2}$. The microprocessor 12 in this case acts as a regulator. The measured value which is determined using the second measurement device 5 and is to be evaluated by the microprocessor 12 is in this case supplied via the third switch 20, which can be controlled by the microprocessor 12. The adjustment to be carried out on the basis of the evaluation by the microprocessor 12, or a change to the amplitude ratio n to be carried out in a corresponding manner, is carried out via the data and control line 26.

As soon as the question in step 108 results in correspondence, the process according to the invention jumps back to the start of step 103, where the changed value (obtained in step 107) for the first signal voltage $v_1$ and the changed value (obtained in step 108) for the second signal voltage $v_2$ are initially used to recalculate the value of the exponent $\gamma_{temp}$ on the basis of the relationship $$\gamma_{temp} = \frac{\log\frac{I_{K2}}{I_{K1}}}{\log\frac{V_2 \pm \Delta V_2}{V_1 \pm \Delta V_1}}$$

before, according to the sequence described so far, which is preferably stored as a program in the microprocessor 12, the following steps are carried out once again. In this case, the steps 103 to 108 are carried out repeatedly until the question in step 106 results in correspondence with the value of the third reference cathode current $I_{K3}$.

As soon as correspondence with the value of the third reference cathode current $I_{K3}$ is obtained, the initialization mode is ended, and a change is made to the appliance's normal operation.

Although the invention has been described on the basis of $\gamma$ matching of a video processor for colour tubes, it can, however, also be applied in the same way to projection tubes.

What is claimed is:

1. Method for controlling the cutoff point and the gain in a video reproduction arrangement having a colour tube or projection tubes, by means of reference cathode currents ($I_{K1}$, $I_{K2}$), which correspond to different brightness levels, caused by measurement pulses ($MI_{K1}$, $MI_{K2}$), comprising the steps of:

injecting, during a vertical frame blanking period, measurement signal voltages ($u_1$, $u_2$) into the drive signals for the colour tube or projection tubes by means of a measurement line generator circuit arranged in a video signal processor;

controlling, using control devices in the video signal processor, both an amplitudes and a DC voltage offset ($u_0$) of the measurement pulses ($MI_{K1}$, $MI_{K2}$) in such a manner that the reference cathode currents ($I_{K1}$, $I_{K2}$) are produced in the colour tube or in the projection tubes, in which case the following relationship applies on the basis of an existing mathematical relationship between a cathode control voltage ($V_K$) and a cathode current ($I_K$):

$$\frac{I_{K2}}{I_{K1}} = \left(\frac{V_{K2}}{V_{K1}}\right)^{\gamma}$$

and using corresponding operating parameter values (n, $v_1$) for the value of the exponent ($\gamma$) in a control algorithm, wherein the operating parameter values (n, $v_1$) are adjustable and are set in an appliance production sequence on the basis of the tube type used, and are stored at a suitable point.

2. Method according to claim 1, wherein the operating parameter values (n, $v_1$) are determined from signal voltages ($V_1$, $V_2$) after correction to the reference cathode currents ($I_{K1}$, $I_{K2}$), which signal voltages ($V_1$, $V_2$) are derived from the cathode control voltages ($V_{K1}$, $V_{K2}$) which are set during a correction to the reference cathode currents ($I_{K1}$, $I_{K2}$).

3. Method for controlling the cutoff point and the gain in a video reproduction arrangement having a colour tube or projection tubes, by means of reference cathode currents ($I_{K1}$, $I_{K2}$), which correspond to different brightness levels, caused by measurement pulses ($MI_{K1}$, $MI_{K2}$), comprising the steps of:

injecting, during a vertical frame blanking period, measurement signal voltages ($u_1$, $u_2$) into the drive signals for the colour tube or projection tubes by means of a measurement line generator circuit arranged in a video signal processor;

controlling, using control devices in the video signal processor, both an amplitudes and a DC voltage offset ($u_0$) of the measurement pulses ($MI_{K1}$, $MI_{K2}$) in such a manner that the reference cathode currents ($I_{K1}$, $I_{K2}$) are produced in the colour tube or in the projection tubes, in which case the following relationship applies on the basis of an existing mathematical relationship between a cathode control voltage ($V_K$) and a cathode current ($I_K$):

$$\frac{I_{K2}}{I_{K1}} = \left(\frac{V_{K2}}{V_{K1}}\right)^\gamma$$

and using corresponding operating parameter values (n, $v_1$) for the value of the exponent ($\gamma$) in a control algorithm, wherein the operating parameter values (n, $v_1$) are adjustable and are defined in an appliance production sequence by circuitry of the video signal processor, on the basis of the tube type used.

* * * * *